(12) United States Patent
Hellman et al.

(10) Patent No.: US 6,386,154 B1
(45) Date of Patent: May 14, 2002

(54) PUMPED EGR SYSTEM

(75) Inventors: Karl H. Hellman, Ann Arbor; Charles L. Gray, Jr., Pinckney, both of MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 0 days.

(21) Appl. No.: 09/592,424

(22) Filed: Jun. 12, 2000

(51) Int. Cl.[7] ............................................. F02M 25/07
(52) U.S. Cl. ................. 123/58.8; 123/568.12; 123/568.13; 123/568.2
(58) Field of Search ..................... 123/58.8, 568.11, 123/568.12, 568.13, 568.14, 568.2

(56) References Cited

U.S. PATENT DOCUMENTS

| | | | | |
|---|---|---|---|---|
| 4,109,625 A | * | 8/1978 | Kawamura et al. | 123/568.13 |
| 4,194,472 A | * | 3/1980 | Amano et al. | 123/58.8 |
| 4,344,405 A | | 8/1982 | Zaharis | 123/68 |
| 4,422,430 A | * | 12/1983 | Wiatrak | 123/568.13 |
| 4,787,343 A | * | 11/1988 | Tuckey | 123/58.8 |
| 5,115,790 A | * | 5/1992 | Kawamura | 123/568.2 |
| 5,379,743 A | | 1/1995 | Stokes et al. | 123/308 |
| 5,425,346 A | | 6/1995 | Mavinahally | 123/568.13 |
| 5,558,070 A | | 9/1996 | Bell et al. | 123/568.21 |
| 5,666,931 A | | 9/1997 | Pierik et al. | 123/568.21 |
| 5,782,226 A | | 7/1998 | Gartner | 123/568.13 |

OTHER PUBLICATIONS

Ahmad, T. and Theobald, M.A., "A Survey of Variable-Valve-Actuation Techology", SAE Technical Paper Series, No. 891674 Aug. 7–10, 1989.
Maekawa, Keiichi and Ohsawa, Namieki, "Development of a Valve Timing Control System", SAE Technical Paper Series, No. 890680, Feb. 27–Mar. 3, 1989.
Dennekbauer-Ebner, A.D. and Lenz, H.P., "Variable Valve Actuation Systems for Optimization of Engine Torque" SAE Technical Paper Services No. 910447, Feb. 25–Mar. 1, 1991.

* cited by examiner

Primary Examiner—Willis R. Wolfe
(74) Attorney, Agent, or Firm—Lorusso & Loud

(57) ABSTRACT

An exhaust gas recirculation system for an internal combustion engine includes an exhaust manifold and at least one exhaust flow control valve located between the engine and the exhaust manifold. The exhaust flow control valve diverts a portion of the exhaust gas from each cycle of one cylinder and feeds that diverted portion to another of the cylinders through an exhaust gas recirculation passage, bypassing the exhaust manifold, whereby an exhaust stroke of a piston within the one cylinder serves to pump exhaust gas through the exhaust flow control valve in another cylinder.

10 Claims, 6 Drawing Sheets

PUMPED EGR SYSTEM

FIELD OF THE INVENTION

This invention pertains to a controllable, high pressure exhaust gas recirculation (EGR) system for engines and reduction of emissions.

THE PRIOR ART

EGR is conventionally used as a method to control (reduce) the emissions of oxides of nitrogen (primarily $NO_2$ and NO) from engines. In a conventional EGR, a portion of the exhaust gas from the engine is returned to the engine to become a portion of later cylinder charge. Because the oxygen content of the cylinder charge is reduced and the temperature of the gases during and after combustion is reduced, oxides of nitrogen are reduced.

In reciprocating internal combustion engines, during the exhaust gas stroke not all of the exhaust gas leaves the cylinder. This gas that remains (the residual gas) is mixed with the fresh air charge during the intake process. EGR systems increase and provide control of higher than baseline residual gas concentrations in the cylinder. EGR systems may also control EGR flow temperatures and EGR flow within the cylinder.

EGR systems may be categorized in accordance with the flow path of the exhaust gases therein and in accordance with the nature of the processes the recirculated exhaust gas undergoes in the flow path.

Internal EGR Systems: In this class of EGR systems, the parameters that influence the concentration of residuals in the cylinder are utilized to change the amount of residual gas. Important parameters are exhaust valve timing, intake valve timing, and exhaust backpressure. To the extent that one or more of these parameters is variable and controllable, the resultant system can control EGR. In this class of systems, in essence, the cylinder provides its own EGR.

External EGR Systems: In this class of EGR systems, exhaust gas is routed into the cylinder, and the exhaust gas introduced into a given cylinder is provided from more than just that one cylinder.

All prior art methods and devices used to perform the function of exhaust gas recirculation involve picking up part of the exhaust gas flow downstream of the exhaust valve and transferring it to an introduction point in the intake system of the engine.

A conventional EGR system is depicted in FIG. 1. FIG. 1 is a schematic of the air and exhaust flows through an engine and the routes for exhaust gas recirculation. While FIG. 1 is a schematic of a turbocharged engine for the purposes of illustration, such conventional EGR systems can be used with non-turbocharged engines (naturally aspirated engines), as well as with supercharged engines. In a non-turbocharged engine, the units C and perhaps D and J can be eliminated, and in the supercharged unit, J would be eliminated.

The inlet air and exhaust gas components of the conventional system illustrated in FIG. 1 are labeled A through M, respectively and the junctions between adjacent components are labeled 1 through 12, respectively.

Exhaust gas may be picked up at one of points 9, 10, 11, and 12, and introduced into the engine at one of points 1, 2, 3, 4, and 5. In the external loop, the EGR treatment apparatus N is one that is used to control recirculated exhaust gas temperature, to filter or catalyze the exhaust gas, or for other purposes. The EGR pump apparatus O can be any of the commonly know pumps whose purpose is to increase the pressure of the recirculated exhaust gas to allow the recirculated exhaust gas to be introduced at the desired location. The exhaust gas after-treatment apparatus K treats the exhaust gas to remove gaseous and/or particulate pollutants. The heat exchanger D in the intake charge stream is typical of current practice with boosted engines and is used to lower or otherwise control the temperature of the inlet charge.

The flow of EGR is controlled by means of a valve called an EGR valve which can be placed in any of the dotted lines in FIG. 1. The purpose of the EGR valve is to control the flow of EGR into the engine since too little EGR may not give the emission reduction desired and too much EGR can cause combustion problems which can lead to increased smoke, particulates, and unburned fuel emissions.

External systems have a subclass system in which the EGR is admitted through the intakes valve(s). These External Intake-valve-admitted (EI) systems represent current practice for many engines. The two basic types of EI systems are those in which the pressure is characterized as High (EIH) or Low (EIL). An example of an EIH system would be one in which the EGR pickup is in the high pressure area—upstream of the turbocharger turbine (at 9 in FIG. 1), and the EGR admission is downstream of the turbocharger compressor (at 3 in FIG. 1). This high pressure circuit is an example of an EIH system. An example of an EIL system is one in which the EGR pickup is downstream of the exhaust after-treatment device (at 11 in FIG. 1), and the EGR inlet is downstream of the air cleaner (at 2 in FIG. 1).

The challenges that EGR systems must meet are good cylinder-to-cylinder distribution and fast transient response. If the same amount of exhaust gas relative to fresh charge is not provided to each cylinder, less than optimum performance will result. If the system cannot respond quickly enough to changes in power required of the engine, then the transient response of the engine will be poorer.

A substantial problem with current practice is the ability of an EGR system to respond quickly to changes. Consider the case of a fuel injection engine in which the fuel charge is controlled electronically. With modern fuel injection systems, the change in fuel injected can be quite rapid, changing from a very low quantity, for example, the ideal fuel injection amount, to the full load injection amount on the next injection event. For a Diesel engine, the fact that fuel changes can be made from cycle to cycle has potential for fast response to load demands, if the changes in the air and EGR charge into the engine can be made as quickly. Unfortunately, for current practice the response of the air/EGR charge is much slower than that of the fuel. In the example given, the transition from low fuel quantity to high fuel quantity will result in unacceptable emissions of smoke and particulate matter because for most systems, as the fuel quantity injected increases beyond a given level, the EGR amount is reduced to provide adequate oxygen in the charge to result in good combustion. In the example given, when the fuel is increased dramatically there is too much exhaust gas in the inlet system and even if the EGR valve is switched to the OFF (no flow) position, it takes some time for the volume between the EGR valve and the inlet valves to attain the proper value of EGR (much lower or even zero) for the example case.

Therefore, current systems have their transient response limited by the response of the air/EGR system which is much slower than it could be, leading to poorer transient response and vehicle driveability. The response is slow because the volume of the EGR system from exhaust valve to intake is too large compared to the displacement of the engine.

For current practice EGR systems, the EGR flow is a function of (1) the pressure difference between the EGR pickup point and the EGR admission point and (2) the EGR valve opening. For current high pressure systems for use with turbocharged engines, the relationship pressure difference is such that EGR is possible only over a narrow engine load range from zero to about 30 percent, since above that range the EGR admission point pressure exceeds the pressure at the EGR pickup, and EGR flow is not possible. This problem is discussed in SAE paper 970542.

The conventional EGR systems are not fast enough to provide the desired control during transients and, accordingly, a faster responding system is needed. In addition, the prior art systems are incapable of recirculating exhaust gas during some engine conditions due to an adverse pressure gradient, leading to the need for a higher pressure system.

SUMMARY OF THE INVENTION

Accordingly, it is an object of the present invention to provide an exhaust gas recirculation (EGR) system which responds more quickly to changes in engine operation, i.e. a faster transient response.

Another object of the present invention is to provide an EGR system capable of generating high pressures to enable EGR flow over a wide variety of engine conditions.

A further object of the present invention is to provide such a faster response EGR system which is applicable to engines of any aspiration type, naturally aspirated, turbocharged, or supercharged.

Another object of the present invention is to utilize the engine as a pump for the EGR.

The foregoing objectives are achieved by the present invention. Toward this end, the present invention provides a unique exhaust circulation system which controls the flow of EGR in a manner different from the prior art, with emphasis placed on control of EGR from the exhaust side of the engine.

The exhaust gas recirculation system of the present invention is adaptable to most, if not all, internal combustion engines having a plurality of cylinders defining respective combustion chambers, each with its own intake and exhaust valves. The exhaust recirculation system of the present invention includes at least one exhaust gas manifold for receiving exhaust gas from the plural cylinders through exhaust lines respectively connected to exhaust valves of the cylinders. An exhaust gas flow control valve is associated with each of the cylinders and is located within one of the exhaust lines. The exhaust gas flow control (EFC) valves each receive exhaust gas from the cylinder associated therewith and apportions the received exhaust gas between a first portion fed to the exhaust manifold and a second portion fed to another cylinder through an exhaust gas recirculation passage.

The present invention may use an exhaust manifold, portions of which are smaller in flow diameter than the conventional exhaust manifolds.

The present invention adds passages, valving, and controls to the conventional exhaust system to allow the exhaust to be pumped from one cylinder into another using the engine's own cylinders as exhaust gas pumps, thus providing a high pressure, fast acting EGR system.

Control of the flow from the pumping cylinder to the receiving cylinder is obtained via the action of the Exhaust Flow Control (EFC) valve. This valve controls the exit of exhaust gases to the exhaust manifold. When the EFC valve blocks the path of the exhaust gases to the exhaust manifold, exhaust gas cannot enter the exhaust manifold and, therefore, is pumped from the pumping cylinder into the receiving cylinder. When the EFC valve does not block the path of the exhaust gas to the exhaust manifold, exhaust gas can pass through to the exhaust manifold. There can be one EFC valve for each cylinder or one for more than one cylinder.

For example, in a 4-cylinder engine there are two intake events and two exhaust events for each crankshaft revolution. This means that if, for example, one EFC valve controls the EGR flow for all four cylinders, then the EFC valve must open and close two times during one engine revolution. In an embodiment with two EFC valves controlling the EGR flow of four cylinders, i.e., two cylinders per EFC valve, each EFC valve opens and closes once during one engine revolution. In an embodiment with four EFC valves, each EFC valve opens and closes once during two engine revolutions.

Any of a number of types of valves can be used for the EFC valve in the present invention, including poppet valves, rotary valves, disc valves, etc.

Admission of the pumped EGR is usually to the cylinder via the intake valves. The admission can also be via the exhaust valves, or via both intake and exhaust valves, but a more complicated valve event control is needed. The flow paths for the recirculated exhaust gas can be fully contained within the engine cylinder head, or some parts of the flow path can be external to the cylinder head, and the flow paths can include EGR flow treatment such as heat exchangers and/or filters.

Since the engine is also a pump for the EGR, the performance of the pumping piston in transferring exhaust gas to the receiving cylinder is important. For effective transfer of exhaust gas, the volume of the flow passage from the pumping piston to the receiving cylinder should be small compared to the displacement of the pumping cylinder. For the most flexible system, the volume of the pumping passage could be selected so that the pressure generated by the pumping cylinder exceeds the highest value of inlet manifold pressure for the engine. In this case, EGR can be used at any operational condition of the engine, if necessary.

This pumped EGR system has a rapid response to commands for changes in EGR rate. The EGR rate is controlled by the timing of the EFC valve(s), and the volume of the transfer passages is small.

For the fastest response to a command to reduce EGR rate, an additional flow control valve is positioned at the entrance to the intake port in the embodiment in which the pumped EGR is admitted to the intake system. These valves may be reed valves or check valves or other valves known to those skilled in the art. In this case, the volume to purge approaches zero, and the response is determined by the response of the main EFC valve(s).

DESCRIPTION OF THE PREFERRED EMBODIMENT

Figure 1:
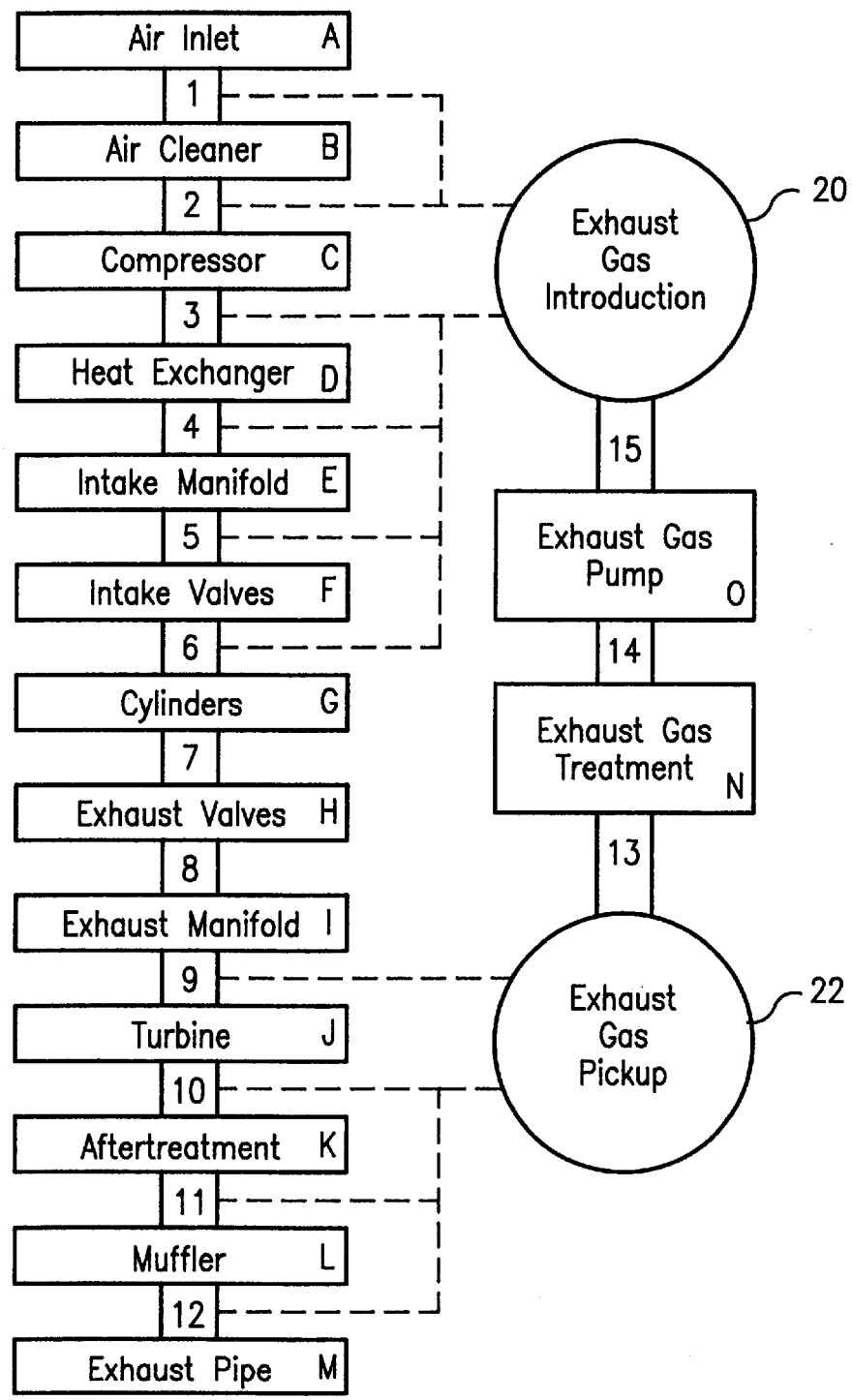
FIG. 1 is a schematic representation of a prior art exhaust gas recirculation system.
Figure 2:
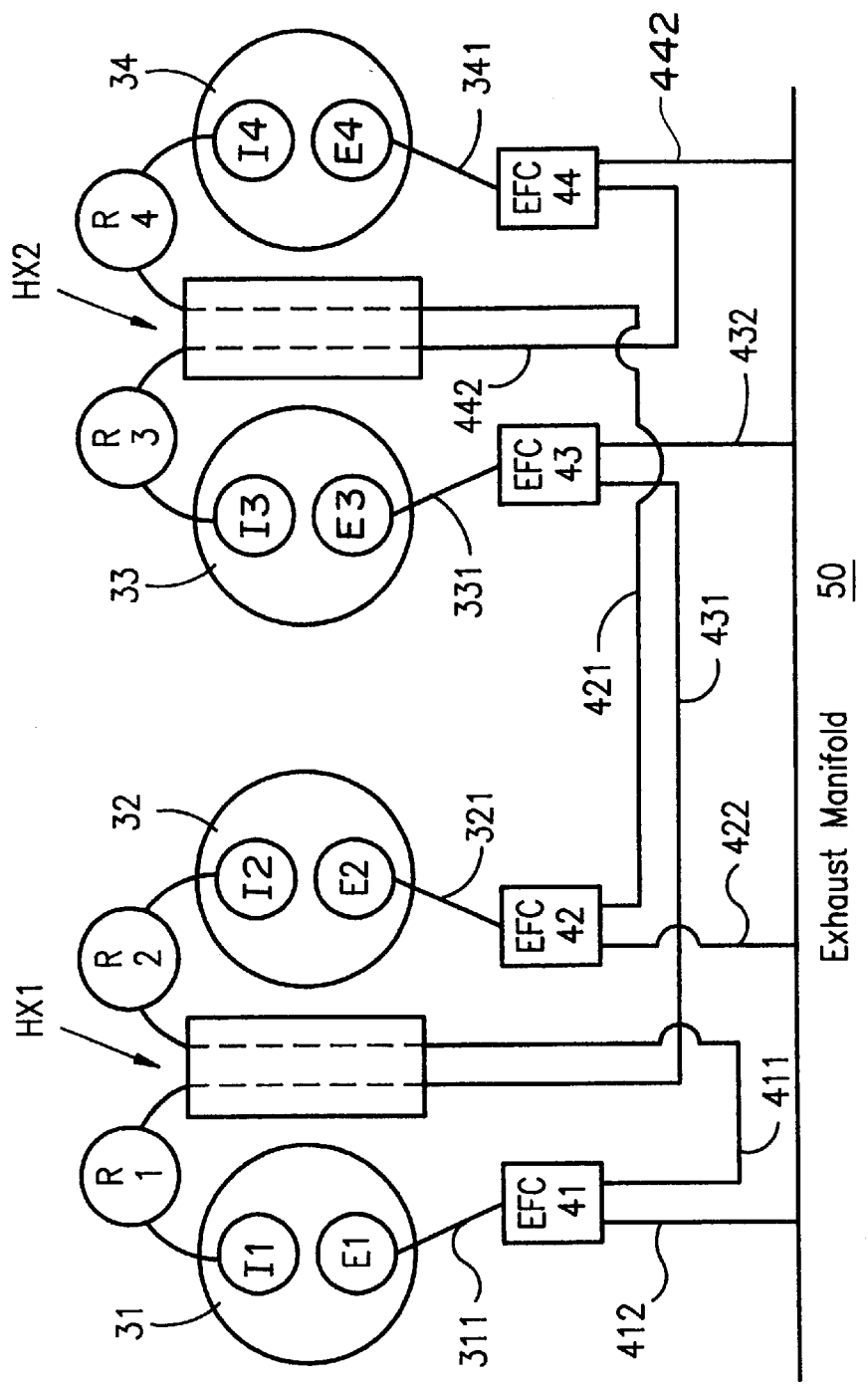
FIG. 2 is a schematic representation of an exhaust gas recirculation system according to a first embodiment of the present invention.

FIG. 2 shows one preferred embodiment wherein the present invention is applied to a turbocharged, 4-cylinder, four stroke cycle engine. The embodiment has the firing order: 31-33-34-32. Cylinder 33 pumps exhaust gas into cylinder 31, cylinder 34 pumps exhaust gas into cylinder 32, cylinder 32 pumps EGR into cylinder 34, and cylinder 31 pumps EGR into cylinder 32. This embodiment has one EFC valve unit for each cylinder, for a total of four (4) EFC valve units. Each EFC valve unit (41, 42, 43 and 44) incorporates two poppet valves. The EFC valves are driven from a camshaft which, in turn, is driven from the camshaft of the engine and which operates at the same speed as the engine's camshaft, one-half of the engine's crankshaft speed. Cams on the EFC camshaft operate the EFC valves. One of the poppet valves in each EFC valve unit controls flow to the EGR passage, while the other poppet valve in the EFC valve unit controls flow to the exhaust manifold 50. The two poppet valves associated with a given cylinder have a degree of overlap, which is denoted by $\theta_o$. In the this embodiment, the valve event for the valve controlling flow to the exhaust manifold precedes the valve event for the valve controlling the EGR flow (the reverse is also possible).

During the engine exhaust event, the EFC valves 41, 42, 43 and 44 receive exhaust gas from cylinders 31, 32, 33 and 34 through exhaust passages 311, 321, 331 and 341, respectively, and apportion the exhaust flow first to the exhaust manifold 50 through exhaust passages 412, 422, 432 and 442 and to the respective EGR passages 411, 421, 431 and 441.

By way of example, EFC valve 41 receives exhaust gas from a single combustion chamber within cylinder 31, more specifically, from an exhaust valve El of cylinder 31 through exhaust line 311. EFC valve 41 apportions the received exhaust gas, in sequence, to feed a first portion to the intake port I2 of cylinder 32, through EGR passage 411 and through heat exchanger HX1 and through the one-way reed valve R2. EPC valves 41, 42, 43 and 44 operate in similar fashion.

Referring to FIG. 2, the combination of exhaust passages 311 and 412, for example, can be regarded as a single exhaust line with flow therethrough regulated by EFC valve 41.

As is further shown in FIG. 2, EGR passages 411, 421, 431 and 441 are respectively provided with one-way valves, i.e. conventional reed valves R1, R2, R3 and R4. Further, EGR passages 441 and 421 pass through heat exchanger HX2 whereby the recirculated exhaust is cooled by countercurrent heat exchange with engine coolant prior to entering cylinders 33 and 34 through intake poppet valves I3 and I4, respectively.

The amount of EGR is varied by changing the phase of the EFC valves in relation to the cylinder exhaust valve. Changing the phase of the EFC valves' camshaft so that the EFC poppet valve controlling the flow into the EGR passage is open for a greater portion of the cylinder exhaust event increases the EGR rate, and changing the phase of the EFC valves' camshaft so that the poppet valve controlling the flow into the EGR passage is open for a lesser portion of the cylinder exhaust event decreases the EGR rate. The mechanism for altering the phasing of the EFC valves' camshaft can be a helical spline which is known to those skilled in the art and which has been used to change timing of engine valves and to change the timing of fuel injection pumps.

The pumped EGR flow path includes heat exchangers which can be of the counterflow type and which uses engine coolant as the heat exchange medium. Reed valves are positioned at the points where EGR flow enters the intake manifold.

For the subject invention, the performance of the system depends on the ratio of the volume of the EGR passage to the displacement of one cylinder ($VE_p/D_{cyl}$), the ratio of the duration of the EFC valve(s) to the exhaust valves ($\theta_d/\theta_e$), the ratio of the lift of the EFC valves to the lift of the exhaust valves ($L_d/L_e$) the overlap between the valve controlling the flow into the exhaust manifold and the valve controlling the flow into the EGR passage ($\theta_o$), and the phasing of the EFC valve events to the exhaust timing of the engine ($\theta_p$).

For the subject invention, the extreme and preferred ranges of the important parameters are shown in Table 1.

TABLE 1

| Parameter | Parameter Values | |
| --- | --- | --- |
| | Extreme Range | Preferred Range |
| $VE_p/D_{cyl}$ | 0.01 to 1.00 | 0.02 to 0.50 |
| $\theta_d/\theta_e$ | 0.25 to 1.50 | 0.50 to 1.00 |
| $L_d/L_e$ | 0.25 to 1.50 | 0.75 to 1.25 |
| $\theta_o$ | 0° to $\theta_d/2$ | 30° to 90° |

The materials required for this invention are similar to those used for exhaust systems today. Any new materials which can be used for exhaust valves, manifolds, etc. can also be used for this invention.

Figure 3:
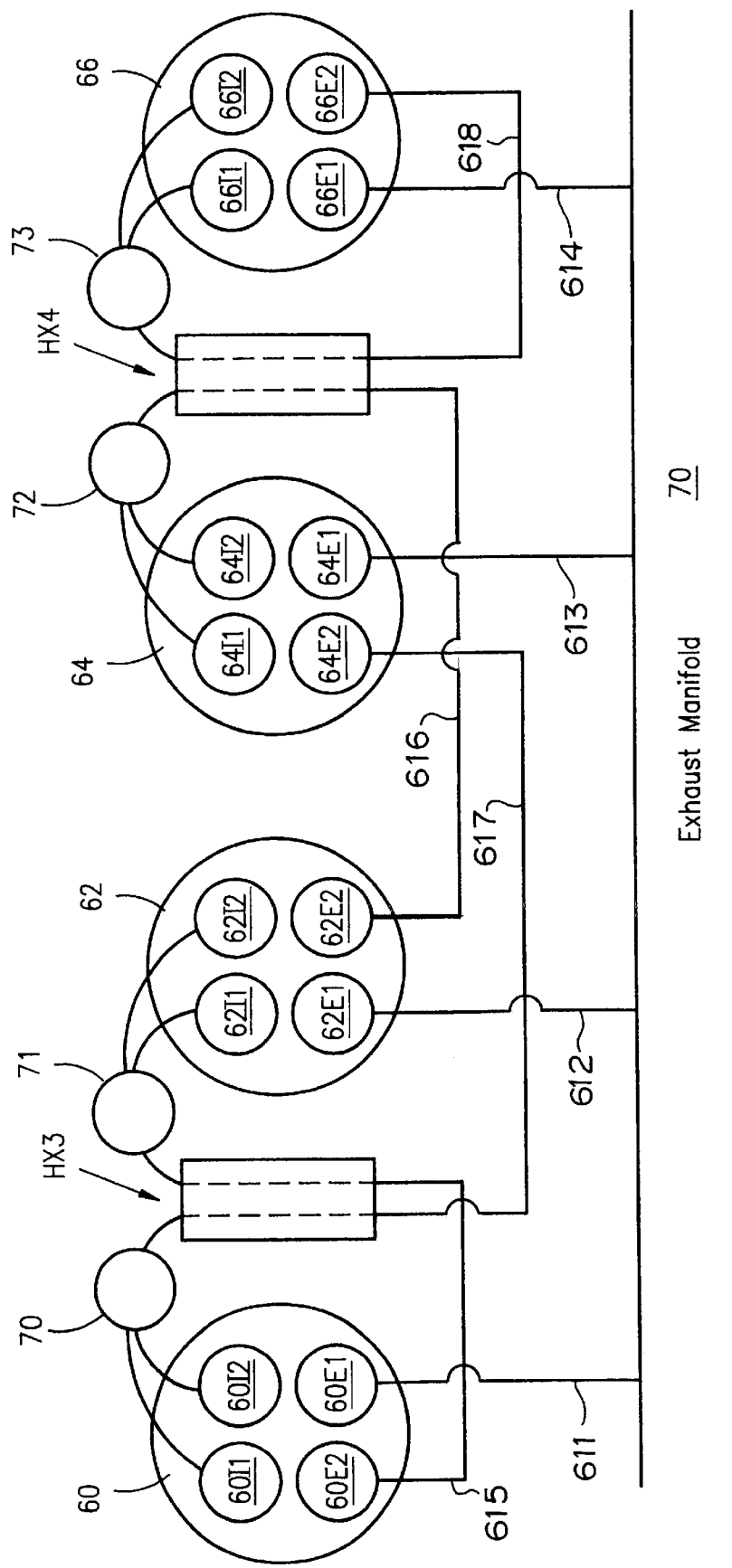
FIG. 3 is a schematic representation of an exhaust gas recirculation system according to a second embodiment of the present invention.

FIG. 3 shows a second embodiment of the present invention applied to an engine having multiple (two or more) exhaust valves. In FIG. 3, this second embodiment is shown as applied to an engine with two intake valves I1 and I2 and two exhaust valves E1 and E2 per each of cylinders 60, 62, 64 and 66. In this embodiment, the exhaust valve ports are separated. One exhaust port E1 from each cylinder leads to the exhaust manifold 70, through one of exhaust passages 611, 612, 613, 614, and the other exhaust port E2 from each cylinder leads to one of the EGR passages 615, 616, 617 and 618. The two exhaust valves E1 and E2 in each cylinder have a degree of overlap, and the exhaust valve E1 which controls the flow to the exhaust manifold 70 leads the exhaust valve E2 which controls flow to one of the EGR passages. In this embodiment, the amount of EGR is controlled by varying the phasing of the exhaust valve camshaft of the engine in the same way that the phasing of the EFC valves' camshaft is controlled in the first preferred embodiment discussed earlier.

Many configurations of this embodiment are possible, depending on the base engine valve configuration. Configurations include those applicable to: (1) an engine with two conventional gas exchange valves, (2) an engine with three conventional gas exchange valves, (3) an engine with four conventional gas exchange valves, and (4) and engine with five gas exchange valves.

In another possible modification of the subject invention, the EGR admission point is positioned downstream of the inlet valve, so that the EGR is pumped directly into the receiving cylinder. In this case, the reed valve is replaced with a poppet valve as the EGR admission valve. In effect, the valve that controls the EGR distribution is moved to the receiving cylinder, and its operation admits EGR directly to the cylinder.

Figure 4:
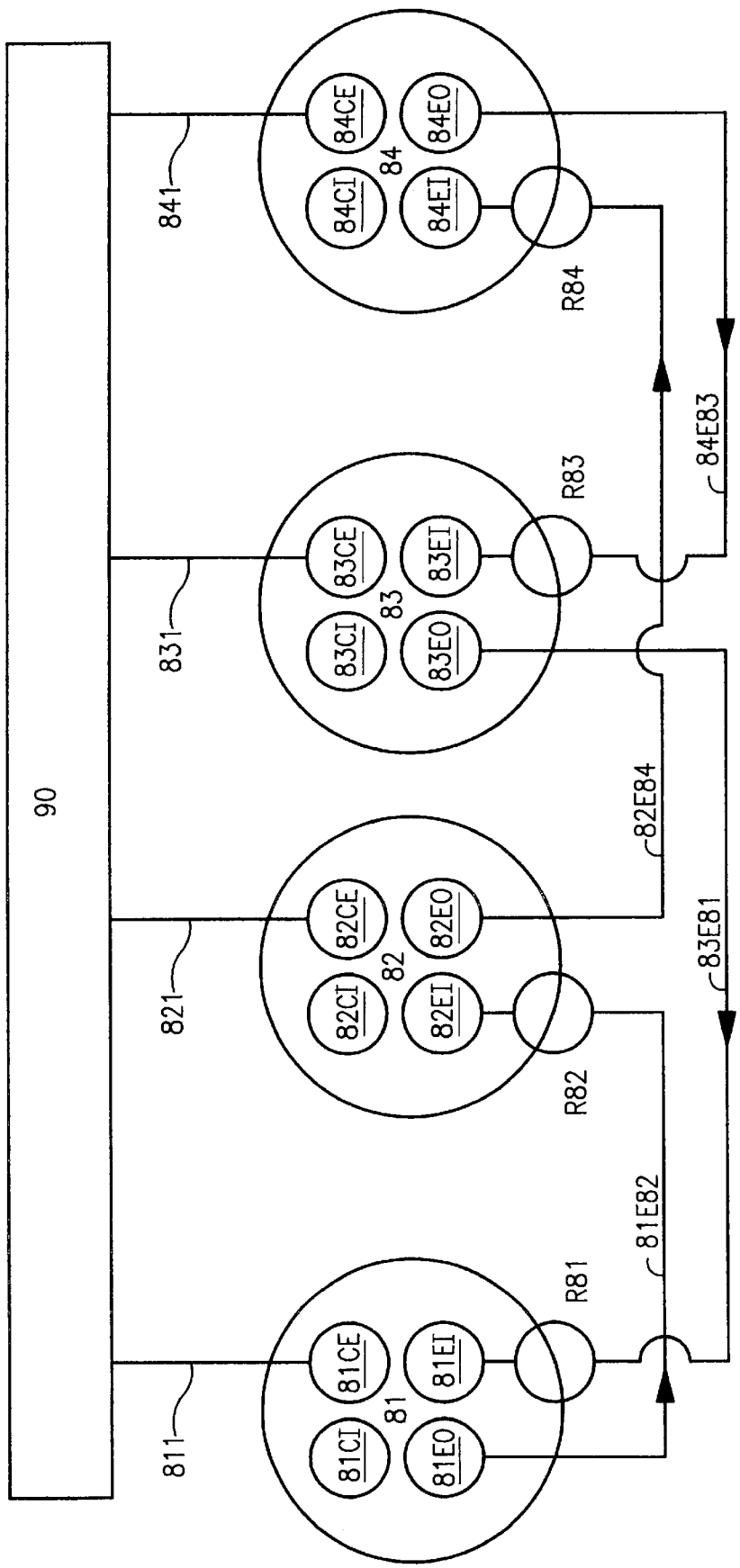
FIG. 4, is a schematic representation of an exhaust recirculation system according to a third embodiment of the present invention.

A third preferred embodiment (the most preferred embodiment) is shown in FIG. 4. In this embodiment, the cylinder head configuration is such that there are four valves per cylinder. Two of these valves in each cylinder are conventional intake and exhaust valves. For the four cylinder engine configuration depicted, the conventional intakes are 81CI, 82CI, 83CI, and 84CI for cylinders 81, 82, 83 and 84, respectively. The conventional exhaust valves are 81CE, 82CE, 83CE, and 84CE for cylinders 81, 82, 83 and 84, respectively.

In FIG. 4, the cylinder head 91 contains two camshafts, the conventional camshaft 100 and the EGR camshaft 200. On the conventional camshaft are lobes CI1, CE1, CI2, CE2, CI3, CE3, CI4 and CE4 control valves which are shown as 81CI, 81CE, 82CI, 82CE, 83CI, 83CE, 84CI and 84CE, respectively, in FIG. 4. On the EGR camshaft are lobes EO1, EI1, EI2, EO2, EO3, EI3, EI4 and EO4 control valves which are shown as 81EO, 81EI, 82EI, 82EO, 83EO, 83EI, 84EI and 84EO, respectively, in FIG. 4. A camshaft phasing device 300 is shown attached to the EGR camshaft 200.

The EGR system is positioned on one side of the cylinder head to reduce package volume and to provide for reduced transfer passage volume. The transfer passages (81E82, 82E84, 83E81, and 84E83 are all enclosed in a heat exchanger (not shown in FIG. 4) to provide for temperature control of the recirculated pumped exhaust gas. The heat exchanger can be integral with the cylinder head or a separate unit or units.

Figure 5:
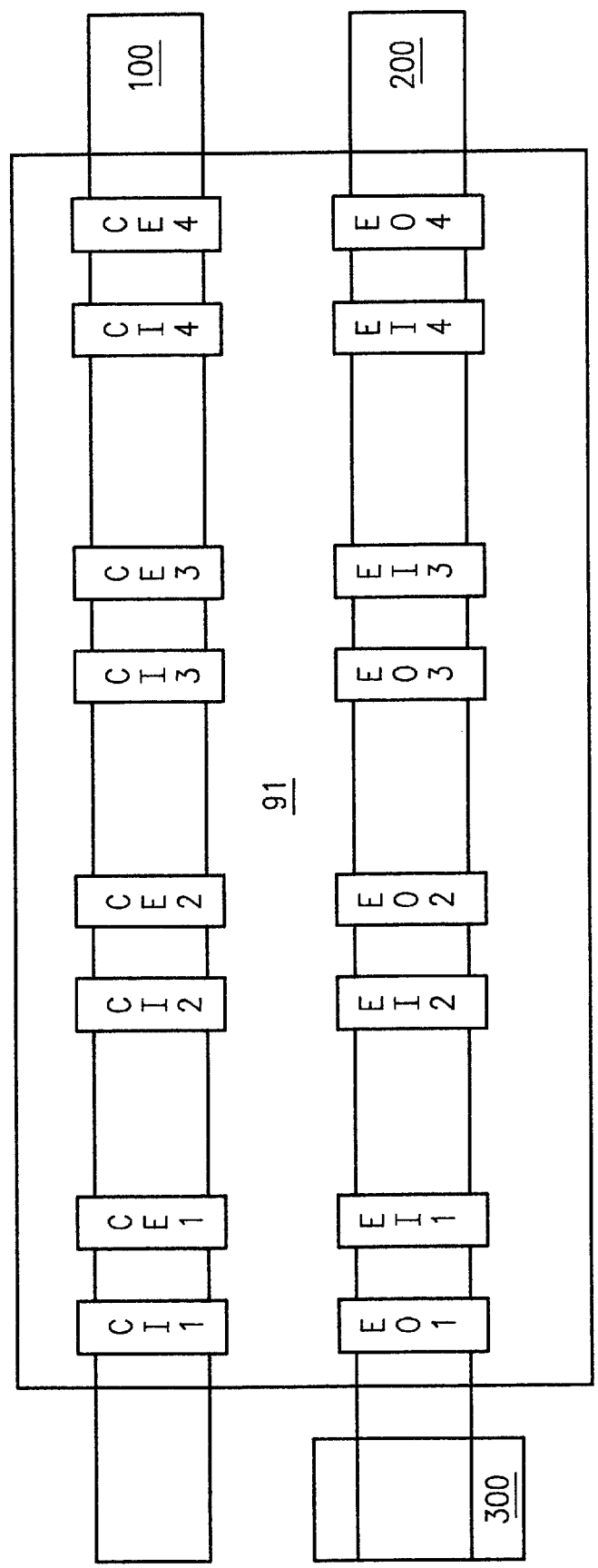
FIG. 5 is a schematic view of a preferred camshaft arrangement.

As shown in FIG. 5, the valves for the engine depicted in FIG. 4 are operated by two separate camshafts. The conventional intake and exhaust valves are operated by one camshaft 100 (the conventional camshaft) and the EGR valves are operated by another camshaft 200. Control of the relative phasing of the EGR camshaft and the conventional camshaft can be obtained via use of a helical spline 300 or other devices known to those skilled in the art, which are used to vary camshaft timing in engines and other machines.

Consider an exhaust event. For the geometry shown in FIG. 4, consider the situation where cylinder 83 is on its exhaust stroke. (The other cylinders will behave in a similar manner.) Cylinder 83 can pump its exhaust to the exhaust manifold 90 via conventional exhaust valve 83CE and passage 831, or it can pump its exhaust into cylinder 81 via passage 83E81, reed valve R81, and EGR inlet valve 81EI.

If conventional exhaust valve 83CE is closed, and EGR outlet valve 83E0 is open, the piston in cylinder 83 will pump the exhaust gas through passage 83E81 and when the pressure exceeds the opening pressure of reed valve R81, into cylinder 81 past EGR inlet valve 81E1, if it is open. This provides for EGR flow.

When conventional exhaust valve 83CE opens, the pressure in the cylinder and in the passage 83E81 drops, reed valve R81 closes, and the piston pumps the exhaust gas out of the cylinder through the passage 831 into the exhaust manifold 90.

It can be seen that controlling the relative phasing between the valve event for valve 83E0 and valve 83CE will control the amount of EGR, and when valve 83CE opens, the EGR is effectively stopped.

The EGR flow can be scheduled prior to or after the conventional exhaust flow depending on the desired result. The valve timing for both the conventional camshaft 100 and the EGR camshaft could be variable, or one or the other could vary relative to the other. A preferred embodiment is one in which the conventional camshaft 100 has fixed timing, and the EGR camshaft phasing is varied to control the EGR rate, via a helical spline or other method known to those skilled in the art.

Figure 6:
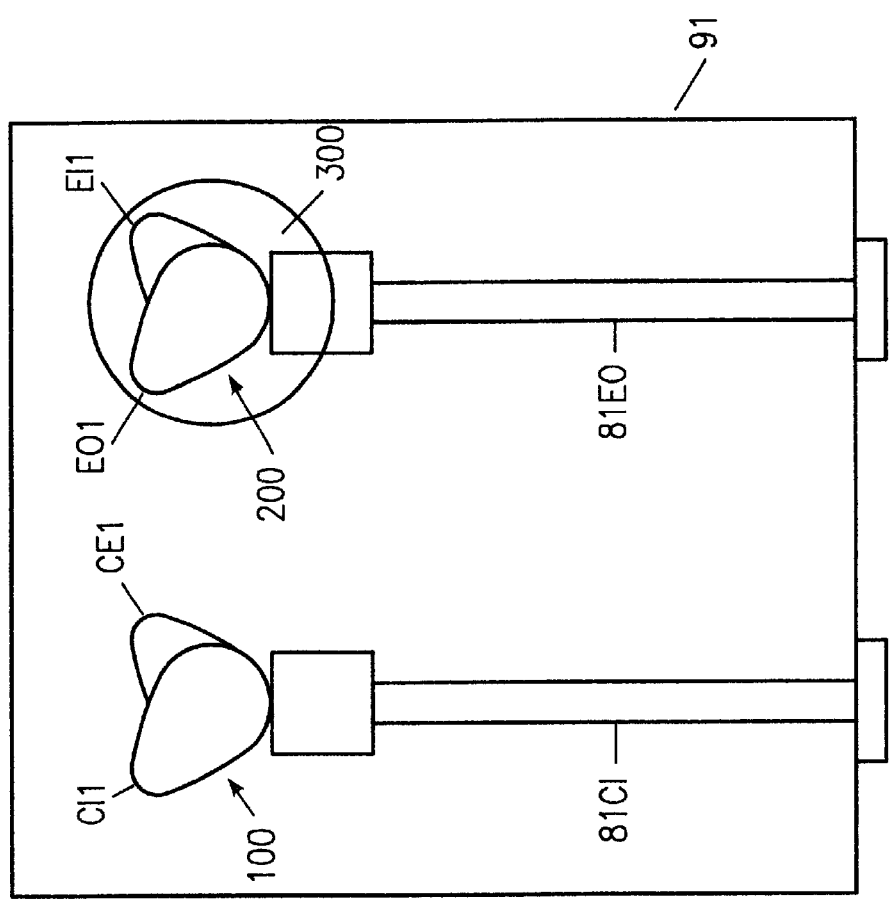
FIG. 6 is a schematic view of the cylinder head showing the camshafts, a phase varying device and four of the camshaft lobes.

FIG. 6 shows an end view of the cylinder head 91. In this view the conventional camshaft lobes CI1 and CE1 on camshaft 100 can be seen as well as the valve 81CI which is operated by camshaft lobe CI1. On the exhaust camshaft 200 side lobes EO1 and EI1 can be seen as well as valve 81EO which is controlled by lobe EO1. The camshaft phasing device 300 is shown attached to exhaust camshaft 200.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An exhaust gas recirculation system for an internal combustion engine having a plurality of cylinders, each of the cylinders defining a combustion chamber and having an exhaust valve and an intake valve, said exhaust system comprising:

exhaust manifold means for receiving exhaust gas from each of said cylinders through exhaust lines respectively connected to exhaust valves of said cylinders; and an exhaust flow control valve associated with at least one of said cylinders, said exhaust flow control valve controlling feed of a portion of the exhaust gas from each cycle of at least said one cylinder to another of the cylinders through an exhaust gas recirculation passage, bypassing said exhaust manifold, whereby an exhaust stroke of a piston within said one cylinder serves to pump exhaust gas through said exhaust flow control valve into said another cylinder; and wherein said exhaust line and said exhaust gas recirculation passage are joined through said exhaust flow control valve which diverts a portion of the exhaust gas received from said one cylinder to the exhaust gas recirculation passage.

2. An exhaust gas recirculation system according to claim 1 further comprising a one-way valve in each of said exhaust recirculation passages between said exhaust gas flow control valve and the another cylinder.

3. An exhaust gas recirculation system according to claim 1 wherein said exhaust gas recirculation passage is in fluid communication with the intake valve of the another cylinder.

4. An exhaust gas recirculation system according to claim 1 further comprising a heat exchanger providing indirect heat exchange between the exhaust gas in said exhaust gas recirculation passage and engine coolant.

5. An exhaust gas recirculation system according to claim 1 wherein the internal combustion engine has a first camshaft for operating the exhaust and intake valves and further comprising:

a second camshaft for operating said exhaust flow control valves.

6. An exhaust gas recirculating system according to claim 5 wherein said second camshaft is driven by said first camshaft and wherein said first and second camshafts rotate at the same speed.

7. An exhaust gas recirculation system for an internal combustion engine comprising:

a plurality of cylinders, each of the cylinders defining a combustion chamber and having at least first and second intake valves and first and second exhaust valves;

exhaust manifold means for receiving exhaust gas from each of said cylinders through exhaust lines respectively connected to exhaust valves of said cylinders;

an exhaust gas re circulation passage, bypassing said exhaust manifold, and connecting one of said exhaust valves of at least one of said cylinders with an intake valve of another of said cylinders, whereby an exhaust stroke of a piston within said one cylinder serves to pump a portion of the exhaust gas from each cycle of said one cylinder exhaust gas through said exhaust gas recirculation passage into another of said cylinders;

a first camshaft operating a first plurality of said exhaust valves and said intake valves;

a second camshaft operating a second plurality of said exhaust valves and said intake valves; and timing means for controlling the relative phasing of said first and second camshafts; and wherein one of said exhaust lines connects the first exhaust valve of said one cylinder with said exhaust manifold and said exhaust gas recirculation passage connects the second exhaust valve of said one cylinder with said another cylinder, through an intake valve of said another cylinder.

8. An exhaust gas recirculation system according to claim 1 wherein said exhaust gas recirculation passage is in fluid communication with the both the first and second intake valves of the another cylinder.

9. An exhaust gas recirculation system according to claim 7 wherein said plurality of cylinders is arranged as an in-line bank of cylinders and wherein said first intake valves and said first exhaust valves are located on one side in-link bank of cylinders and said second intake valves and said second exhaust valves are located on the other side of said in-line bank of cylinders, said exhaust gas valves including valves which open to deliver exhaust gas to the exhaust gas recirculation passage and valves which open to receive exhaust gas which is pumped from one cylinder to another cylinder, wherein said exhaust gas recirculation passage contains a reed valve to permit one-way flow of exhaust gas from the pumping cylinder into the receiving cylinder and wherein said exhaust gas recirculation passages are contained in a heat exchanger for indirect heat exchange with air or engine coolant.

10. An exhaust gas recirculation system according to claim 7 wherein said plurality consists of said first intake valves and said first exhaust valves and said second plurality consists of said second intake valves and said second exhaust valves.

* * * * *